Patented Jan. 13, 1942

2,270,200

UNITED STATES PATENT OFFICE 2,270,200

INSOLUBILIZATION OF WATER-SOLUBLE CELLULOSE ETHERS

Richard M. Upright, Midland, Mich., assignor to The Dow-Chemical Company, Midland, Mich., a corporation of Michigan No Drawing. Application September 26, 1940, Serial No. 358,422

17 Claims. (Cl. 260—232)

This invention relates to a method of insolubilization of water-soluble cellulose ethers, whereby such ethers are made to be insoluble in organic solvents and substantially insoluble in water. It relates in particular to such a method applied to methyl cellulose of the water-soluble type.

Water-soluble cellulose ethers have certain characteristics which make them superior for some purposes to their organo-soluble counterparts. Their solubility in water also is an advantage, particularly where economy of operation and freedom from the expense and hazard incident to the use of volatile organic solvents is desired. At the same time, water-solubility may not be a desirable attribute in the finished article, whether it be free film, filament or a coating on paper, cloth or like flexible base. Thus, for abrasion-resistance of the article and for simplicity and economy of operation in producing the same, it may be desired to use a water solution of a water-soluble cellulose ether. It may, at the same time, be desired to have the finished article insoluble, or substantially so, in water, and insoluble in organic solvents. Further, it may be desired that the cellulose ether in the finished article exhibit flexibility and possess a degree of clarity comparable with the corresponding properties of the customary organo-soluble cellulose ethers which might be used for analogous purposes.

It is accordingly an object of the invention to provide a method whereby water-soluble cellulose ethers may be employed in, or applied from, water solution, and then insolubilized, both as regards water and organic solvents, by simple and inexpensive means. Another object is to provide a predominantly cellulose ether composition, where the cellulose ether is of the water-soluble type, which is capable of being converted easily to a substantially water-insoluble form. A particular object of the invention is to provide a method and a composition as aforesaid whereby water-soluble methyl cellulose may be converted to an insoluble form. Other and related objects will appear hereinafter.

According to the present invention, the foregoing and related objects may be attained through the employment of particular insolubilizing agents in water-soluble cellulose ether compositions, as will more fully be described in the following description, wherein the invention will be illustrated with respect to water-soluble methyl cellulose.

It has now been found that a substantially water-insoluble form of methyl cellulose is obtained when there is added to a water solution of methyl cellulose a particular type of polycarboxylic acid in amount varying from ¼ to 1, and preferably from ½ to 1 equivalent weight of the acid, based on the weight of methyl cellulose and on the presumption that each $C_6$ unit of the methyl cellulose contains one free hydroxyl group, then depositing the desired coating or film or filament from the solution, and thereafter heating the article at temperatures from 120° C. to 180° C. and preferably from 150° C. to 160° C. for a period of from about 20 to about 120 minutes, the time required varying inversely with the temperature within the respective recited ranges of time and temperature. Of a large number of water-soluble polycarboxylic acids tested, only tartaric and malic acids could be used among the dibasic acids, and their products with methyl cellulose were somewhat yellow in color, while all tricarboxylic acids of the water-soluble type which could be obtained proved to be particularly satisfactory for the stated purpose. Included in the group of tricarboxylic acids are citric acid and tricarballylic acid, both of which are available commercially. The above-named tricarboxylic acids, when used according to the invention, give insoluble methyl cellulose products of high flexibility and substantially free from yellowing or other discoloration.

The following examples illustrate the practice of the invention, but are not to be construed as limiting.

Example 1

To a 6 per cent solution in water of methyl cellulose, of 31.4 per cent methoxy content, was added 50 per cent of the theoretical amount of tricarballylic acid to react with the single remaining hydroxyl group in the methyl cellulose. Films were cast from the so-formed aqueous solution, and samples of the films were heated for periods varying up to 120 minutes at temperatures of 100°, 125°, 150°, 160°, and 180° C. Each film was then immersed in water for 3 hours at room temperature to determine the amount of water-soluble material remaining. The films were removed from the water, which was then titrated to determine the amount of free acid extracted from the film. The films were dried and weighed to determine weight loss. It was found that total reaction to an acid-free state required 120 minutes at 180° C. but that within 30 minutes at this temperature minimum water solubility was obtained, accompanied by low residual acidity. Temperatures above 150° C. induced embrittlement of the film when continued over 30 minutes.

Comparable tests were made using 12.5, 25, 100, and 150 per cent of the theoretical amount of acid over the same ranges of time and temperature. It was found that in each case when temperatures above 120° C. were employed and when heating was continued in the particular temperature range for a time varying upward from 20 minutes, the samples became continuously less and less soluble in water. Thus, after 60 minutes heating at 125° C., a film containing 50 per cent of the theoretical amount of acid contained 20 per cent of water-soluble matter. After the same period of heating at 150° C. and 180° C., samples having the same amount of acid originally present gave water solubility figures of 6 and 3 per cent respectively. The same three samples were found to have remaining 55, 18, and 4 per cent of the acid originally introduced into the solution from which they were made. Similar data were obtained on filaments containing various other amounts of acid. After these and numerous other tests it became clear that optimum conditions are those in which from ¼ to 1, and preferably from ½ to 1 equivalent weight of the acid is employed for each $C_6$ unit of the cellulose ether, and in which the article prepared is heated at temperatures from 120° C. to 180° C., preferably from 150° C. to 160° C. for a period varying inversely with the temperature from 2 hours down to about 20 minutes.

*Example 2*

In a similar manner to that disclosed in the previous example, citric acid was employed as the insolubilizing agent. The results were parallel to those obtained when using the acid of the first example. The same limits of concentration, temperature, and time were found to apply.

The invention has been illustrated with respect to methyl cellulose as the cellulose ether. It relates as well to the treatment of other water-soluble cellulose ethers including, for example, hydroxy ethyl cellulose, cellulose glycolic acid salts, and the like.

The invention is of use not only in the preparation of free films but also in the production from aqueous solution of water-insoluble filaments or surface coatings.

I claim:

1. The method which comprises dissolving in a water solution of a water-soluble cellulose ether a water-soluble polycarboxylic acid capable of reacting therewith at elevated temperatures to insolubilize the cellulose ether, in amount from ¼ to 1 equivalent weight of the acid for each $C_6$ unit of the cellulose ether, drying the mixture to remove water, and heating to a temperature between about 120° C. and about 180° C. for a period, varying correspondingly from about 120 to about 20 minutes, sufficient substantially to insolubilize the dried cellulose ether.

2. The method which comprises dissolving in a water solution of a water-soluble cellulose ether a water-soluble dicarboxylic acid capable of reacting therewith at elevated temperatures to insolubilize the cellulose ether, in amount from ¼ to 1 equivalent weight of the acid for each $C_6$ unit of the cellulose ether, drying the mixture to remove water, and heating to a temperature between about 120° C. and about 180° C. for a period, varying correspondingly from about 120 to about 20 minutes, sufficient substantially to insolubilize the dried cellulose ether.

3. The method which comprises dissolving malic acid in a water solution of a water-soluble cellulose ether, in amount from ¼ to 1 equivalent weight of the acid for each $C_6$ unit of the cellulose ether, drying the mixture to remove water, and heating to a temperature between about 120° C. and about 180° C. for a period, varying correspondingly from about 120 to about 20 minutes, sufficient substantially to insolubilize the dried cellulose ether.

4. The method which comprises dissolving in a water solution of a water-soluble cellulose ether a water-soluble tricarboxylic acid capable of reacting therewith at elevated temperatures to insolubilize the cellulose ether, in amount from ¼ to 1 equivalent weight of the acid for each $C_6$ unit of the cellulose ether, drying the mixture to remove water, and heating to a temperature between about 120° C. and 180° C. for a period, varying correspondingly from about 120 to about 20 minutes, sufficient substantially to insolubilize the dried cellulose ether.

5. The method which comprises dissolving tricarballylic acid in a water solution of a water-soluble cellulose ether, in amount from ¼ to 1 equivalent weight of the acid for each $C_6$ unit of the cellulose ether, drying the mixture to remove water, and heating to a temperature between about 120° C. and about 180° C. for a period, varying correspondingly from about 120 to about 20 minutes, sufficient substantially to insolubilize the dried cellulose ether.

6. The method which comprises dissolving tricarballylic acid in a water solution of a water-soluble cellulose ether, in amount from ½ to 1 equivalent weight of the acid for each $C_6$ unit of the cellulose ether, drying the mixture to remove water, and heating to a temperature between about 150° C. and 160° C. for a period between about 120 and about 20 minutes, sufficient substantially to insolubilize the dried cellulose ether.

7. The method which comprises dissolving citric acid in a water solution of a water-soluble cellulose ether, in amount from ¼ to 1 equivalent weight of the acid for each $C_6$ unit of the cellulose ether, drying the mixture to remove water, and heating to a temperature between about 120° C. and about 180° C. for a period, varying correspondingly from about 120 to about 20 minutes, sufficient substantially to insolubilize the dried cellulose ether.

8. The method which comprises dissolving citric acid in a water solution of a water-soluble cellulose ether, in amount from ¼ to 1 equivalent weight of the acid for each $C_6$ unit of the cellulose ether, drying the mixture to remove water, and heating to a temperature between about 150° C. and about 160° C. for a period between about 120 and about 20 minutes, sufficient substantially to insolubilize the dried cellulose ether.

9. The method as claimed in claim 1, wherein the cellulose ether is water-soluble methyl cellulose.

10. The method as claimed in claim 2, wherein the cellulose ether is water-soluble methyl cellulose.

11. The method as claimed in claim 4, wherein the cellulose ether is water-soluble methyl cellulose.

12. The method as claimed in claim 6, wherein the cellulose ether is water-soluble methyl cellulose.

13. The method as claimed in claim 8, wherein the cellulose ether is water-soluble methyl cellulose.

14. The water-insoluble product of the reaction of a normally water-soluble cellulose ether and a polycarboxylic acid, substantially identical with that which is obtained by dissolving in a water solution of a water-soluble cellulose ether a water-soluble polycarboxylic acid capable of reacting therewith at elevated temperatures to insolubilize the cellulose ether, in amount from ¼ to 1 equivalent weight of the acid for each $C_6$ unit of the cellulose ether, drying the mixture to remove water, and heating to a temperature between about 120° C. and about 180° C. for a period, varying correspondingly from about 120 to about 20 minutes, sufficient substantially to insolubilize the dried cellulose ether.

15. The water insoluble product of the reaction of a normally water-soluble methyl cellulose and tricarballylic acid, substantially identical with that obtained by dissolving tricarballylic acid in a water solution of methyl cellulose in amount from ½ to 1 equivalent weight of the acid for each $C_6$ unit of the methyl cellulose, drying the mixture to remove water, and heating to a temperature between about 120° and about 180° C. for a period varying correspondingly from about 120 to about 20 minutes, sufficient substantially to insolubilize the methyl cellulose.

16. The water-insoluble product of the reaction of a normally water-soluble methyl cellulose and citric acid, substantially identical with that obtained by dissolving citric acid in a water solution of methyl cellulose in amount from ½ to 1 equivalent weight of the acid for each $C_6$ unit of the methyl cellulose, drying the mixture to remove water, and heating to a temperature between about 120° and about 180° C. for a period varying correspondingly from about 120 to about 20 minutes, sufficient substantially to insolubilize the methyl cellulose.

17. The water-insoluble product of the reaction of a normally water-soluble methyl cellulose and malic acid, substantially identical with that obtained by dissolving maleic acid in a water solution of methyl cellulose in amount from ½ to 1 equivalent weight of the acid for each $C_6$ unit of the methyl cellulose, drying the mixture to remove water, and heating to a temperature between about 120° and about 180° C. for a period varying correspondingly from about 120 to about 20 minutes, sufficient substantially to insolubilize the methyl cellulose.

RICHARD M. UPRIGHT.